US008583121B2

(12) United States Patent
Fujii

(10) Patent No.: US 8,583,121 B2
(45) Date of Patent: Nov. 12, 2013

(54) MOBILE COMMUNICATION SYSTEM, RADIO APPARATUS, AND RADIO FREQUENCY CHANGE METHOD

(75) Inventor: Hiroyuki Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/491,833

(22) Filed: Jun. 8, 2012

(65) Prior Publication Data

US 2012/0244864 A1 Sep. 27, 2012

Related U.S. Application Data

(63) Continuation of application No. PCT/JP2009/071157, filed on Dec. 18, 2009.

(51) Int. Cl.
*H04W 36/00* (2009.01)
(52) U.S. Cl.
USPC ........... 455/436; 455/446; 455/561; 455/437; 455/67.11; 455/439; 455/331; 455/432.1; 455/78
(58) Field of Classification Search
USPC .............. 455/436, 446, 561, 437, 67.11, 439, 455/507, 67.1, 331, 432.1, 78; 370/312, 370/331, 328, 254, 332, 401
See application file for complete search history.

(56) References Cited

U.S. PATENT DOCUMENTS

| 8,270,431 | B2 * | 9/2012 | Brisebois et al. | ............. | 370/464 |
| 2010/0151857 | A1 * | 6/2010 | Brisebois et al. | ............. | 455/434 |
| 2010/0151858 | A1 * | 6/2010 | Brisebois et al. | ............. | 455/434 |
| 2010/0178924 | A1 | 7/2010 | Kashiwase | | |
| 2010/0260068 | A1 * | 10/2010 | Bhatt et al. | ..................... | 370/254 |
| 2012/0238273 | A1 * | 9/2012 | Lim et al. | ...................... | 455/436 |

FOREIGN PATENT DOCUMENTS

| JP | 9-247079 | 9/1997 |
| JP | 11-186953 | 7/1999 |
| JP | 2007-266990 | 10/2007 |
| JP | 2009-118320 | 5/2009 |

OTHER PUBLICATIONS

International Search Report dated Feb. 2, 2010, from corresponding International Application No. PCT/JP2009/071157.

* cited by examiner

*Primary Examiner* — Joseph Arevalo
(74) *Attorney, Agent, or Firm* — Katten Muchin Rosenman LLP

(57) ABSTRACT

A mobile communication system includes a first base station which defines a first cell and a second base station which defines a second cell. In this mobile communication system, when communication conditions of a first mobile station currently radio-linked to the first or second base station have degraded, then the first base station stores identification information of a second mobile station currently radio-linked to the first base station and causes the second mobile station to hand over to the second cell, and thereafter changes a first radio frequency currently used in the first cell to a second radio frequency and sends the second base station a message that carries identification information of the second mobile station and information indicating the second radio frequency. When the message is received, the second base station causes the second mobile station to hand over to the first cell.

5 Claims, 15 Drawing Sheets

MOBILE COMMUNICATION SYSTEM, RADIO APPARATUS, AND RADIO FREQUENCY CHANGE METHOD

CROSS-REFERENCE TO RELATED APPLICATION

This application is a continuation application and is based upon PCT/JP2009/071147, filed on Dec. 18, 2009, the entire contents of which are incorporated herein by reference.

FIELD

The present invention relates to a mobile communication system, a base station, and a radio frequency change method.

BACKGROUND

In recent years, a base station having a small communication coverage area of up to several tens of meters in radius has been developed, and is referred to as a femto base station. A base station having a wide communication coverage area (for example, ranging from several hundred meters to a dozen or so kilometers in radius) is referred to as a macro base station.

By installing such a femto base station in a place where radiowaves from the macro base station are difficult to reach, the communication coverage area of a mobile station such as a mobile phone can be expanded. Further, when a large number of femto base stations are installed, the number of mobile stations connected to one particular base station can be reduced. Since this serves to increase the amount of radio resources to be allocated to each mobile station, the communication speed increases, and as a result, better communication service can be provided to the user of the mobile station.

Further, by installing a femto base station at a user's premises and allocating a private channel to a specific user, it is possible to provide a communication service that allows the specific user to monopolize that channel.

When installing a femto base station, the radio frequency that the femto base station uses is chosen to be as different as possible from the radio frequency used by any macro base station located in the neighborhood of the femto base station, in order to prevent the occurrence of radiowave interference in the area where the femto base station is installed. However, in a place such as an apartment complex where many femto base stations are installed within a limited area, it may be difficult to set the radio frequency of each femto base station so as to avoid possible radiowave interference. Furthermore, depending on the congestion in a macro cell defined by the macro base station to cover the area of the femto base station, radiowave interference may easily occur. Further, if the radio frequency of any given femto base station is chosen so as not to cause radiowave interference, there are still cases where radiowave interference occurs during the operation of the femto base station. For example, when the mobile station currently radio-linked to the macro base station moves around or moves toward the femto base station, the radiowave conditions may change. In such cases, radiowave interference occurs at the mobile station or at one or the other of the base stations.

If such radiowave interference occurs, the quality of the radiowave received at the mobile station or at the base station degrades, and the mobile station or the base station may not be able to reproduce the received radiowave signal. This may result in a disconnection of the radio link between the mobile station and the base station, or may reduce communication throughput or cause a degradation in the quality of the voice received by the mobile station.

In view of the above, technologies for reducing such radiowave interference have been proposed in the prior art (for example, refer to Japanese Laid-open Patent Publication No. H09-247079). In one such prior art example, when radiowave interference occurs at a mobile station connected to a micro cell base station due to a radiowave being emitted from another mobile station connected to a macro cell base station, the mobile station experiencing the interference is handed off to a frequency band different from the currently used frequency band. Alternatively, the mobile station is handed off between the macro cell defined by the macro base station and the micro cell defined by the micro base station.

SUMMARY

However, the femto base station may be constructed so that only one cell can be formed, i.e., only one radio frequency can be used at a time, in order to reduce the size of the base station. In such cases, if there is a mobile station radio-linked using one particular radio frequency, as in the prior art, the femto base station is unable to change the radio frequency used. Further, if the radiowave conditions degrade due to interference, and the mobile station performing communication via the femto base station is handed over to the macro base station, the load of the macro base station increases, and the communication efficiency may degrade. Therefore, from the standpoint of improving the communication efficiency, it is preferable that, in order to equalize the load between the base stations, the mobile station currently radio-linked to the femto base station continues to perform communication via the femto base station as long as it is located within the communication coverage area of the femto base station.

According to one embodiment, a mobile communication system is provided. The mobile communication system includes a first base station which defines a first cell and a second base station which defines a second cell that covers an area at least a portion of which overlaps an area that the first cell covers. In this communication system, when it is determined by the first or second base station that communication conditions of a first mobile station currently radio-linked to the first or second base station have degraded, then the first base station stores identification information of a second mobile station that belongs to the first cell and that is currently radio-linked to the first base station, and causes the second mobile station to hand over to the second cell; thereafter, the first base station changes a first radio frequency currently used in the first cell to a second radio frequency that is different from the first radio frequency, and sends the second base station a message that carries identification information of the second mobile station and information indicating the second radio frequency.

When the message is received, the second base station notifies the second mobile station identified by the identification information carried in the message of the second radio frequency, and causes the second mobile station to hand over to the first cell.

According to another embodiment, a base station which defines a first cell is provided. The base station includes: a storing unit which stores identification information of a mobile station that belongs to the first cell and that is currently radio-linked to the base station; a communication control unit which, when a first message instructing the base station to change a radio frequency used in the first cell is received from another base station that defines a second cell that covers an area at least a portion of which overlaps an area that the first cell covers, then causes the mobile station to hand over to the second cell; a frequency selection unit which changes the first radio frequency used in the first cell to a second radio frequency that is different from the first radio frequency, and which generates a second message that carries information indicating the second radio frequency and identification information of the mobile station handed over to the second cell and that instructs the other base station to cause the mobile station to hand over back to the first cell; and a network signal processing unit which transmits the second message to the other base station.

According to still another embodiment, a base station which defines a first cell is provided. The base station includes: a communication condition judging unit which judges whether communication conditions of a first mobile station currently radio-linked to the base station have degraded or not; a frequency reselection instructing unit which, when the communication conditions of the first mobile station have degraded, generates a first message for instructing another base station to change a first radio frequency used in a second cell that is formed by the other base station and that covers an area at least a portion of which overlaps an area that the first cell covers, and to cause a second mobile station currently radio-linked to the other base station to hand over to the first cell; a network signal processing unit which transmits the first message to the other base station; and a communication control unit which after the second mobile station has been handed over to the first cell, when a second message that carries information indicating a second radio frequency used in the second cell and identification information of the second mobile station is received from the other base station, then notifies the second mobile station identified by the identification information carried in the second message of the second radio frequency and causes the second mobile station to hand over back to the second cell.

According to yet another embodiment, a radio frequency change method for use in a mobile communication system that includes a first base station which defines a first cell and a second base station which defines a second cell that covers an area at least a portion of which overlaps an area that the first cell covers, is provided. In this radio frequency change method, the first or second base station determines whether communication conditions of a first mobile station currently radio-linked to the first or second base station have degraded or not. When it is determined by the first or second base station that the communication conditions of the first mobile station have degraded, the first base station then stores identification information of a second mobile station that belongs to the first cell and that is currently radio-linked to the first base station and causes the second mobile station to hand over to the second cell, and thereafter changes a first radio frequency currently used in the first cell to a second radio frequency that is different from the first radio frequency and sends the second base station a message that carries identification information of the second mobile station and information indicating the second radio frequency.

When the message is received, the second base station notifies the second mobile station identified by the identification information carried in the message of the second radio frequency, and causes the second mobile station to hand over to the first cell.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A mobile communication system according to one embodiment will be described below with reference to the drawings.

In this mobile communication system, the area of a femto cell defined by a femto base station overlaps at least partially with the area of one macro cell defined by a macro base station. In the mobile communication system, if a degradation of communication conditions due to radiowave interference occurs at the macro base station or the femto base station or at any one of mobile stations, all of the mobile stations currently radio-linked to the femto base station are temporarily handed over from the femto cell to the macro cell. Then, after changing the radio frequency that the femto base station uses for communication with the mobile stations, the mobile stations are handed over from the macro cell back to the femto cell.

It is assumed that this mobile communication system conforms, for example, to Long Term Evolution (LTE), a communication standard for which the Third Generation Partnership Project (3GPP) is proceeding with standardization work.

Figure 1:
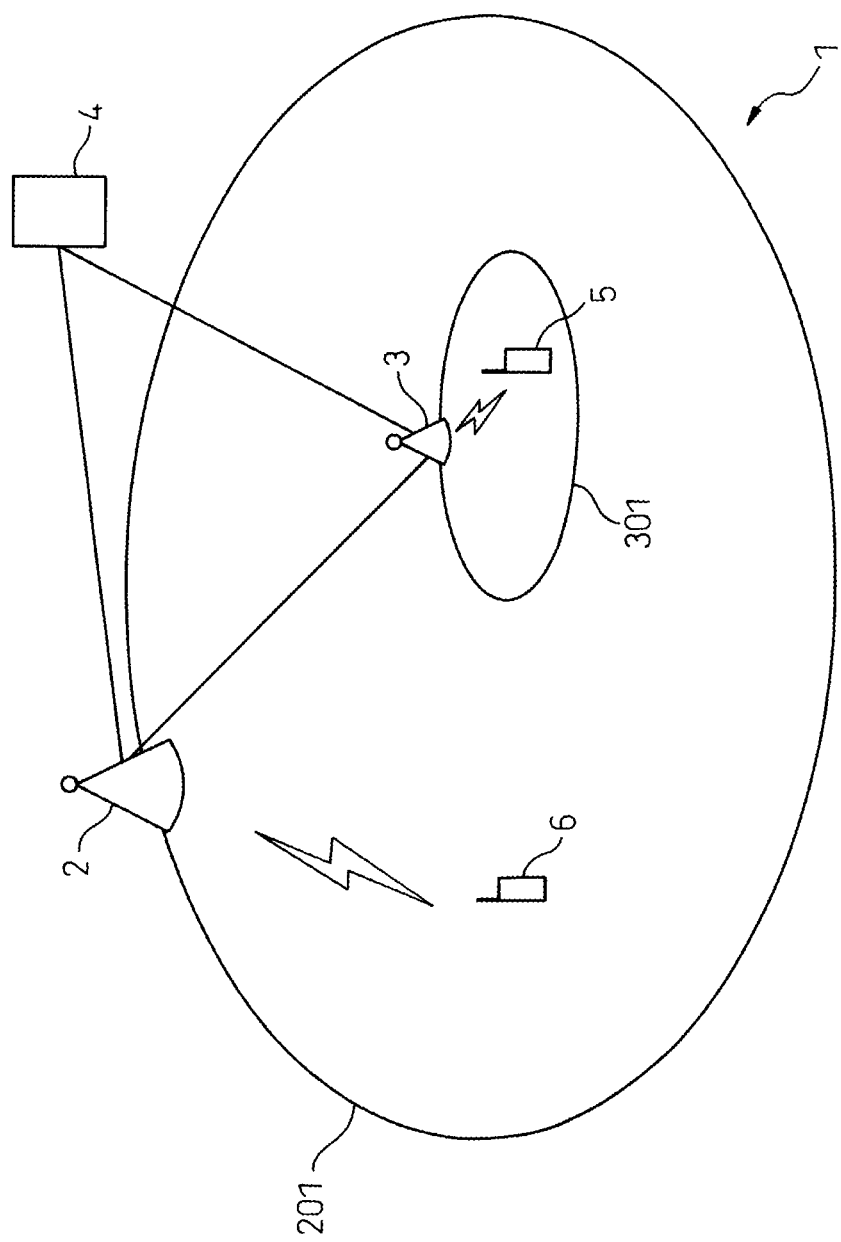
FIG. 1 is a diagram schematically illustrating the configuration of a mobile communication system according to one embodiment.

FIG. 1 is a diagram schematically illustrating the configuration of the mobile communication system according to the one embodiment. The mobile communication system 1 includes a macro base station 2, a femto base station 3, an upper node 4, and mobile stations 5 and 6. The base stations are each connected to the upper node 4 via a communication network. Further, the macro base station 2 and the femto base station 3 are connected so that they can directly communicate with each other. As an example, the mobile communication system 1 depicted in FIG. 1 includes one macro base station and one femto base station. However, the number of macro base stations and the number of femto base stations in the mobile communication system 1 are not limited to one. Further, the number of mobile stations in the mobile communication system 1 is not limited to two.

The macro base station 2 is an apparatus that relays communications between the mobile stations 5, 6 and the upper node 4. The macro base station 2 corresponds, for example, to Evolved Universal Terrestrial Radio Access Network (E-UTRAN) NodeB (eNB) in LTE.

The femto base station 3 is also an apparatus that relays communications between the mobile stations 5, 6 and the upper node 4. The femto base station 3 also corresponds to eNB in LTE.

The upper node 4 is an apparatus that relays communications between the mobile stations 5, 6 and a core network. The upper node 4 corresponds, for example, to Mobility Management Entity (MME) and/or Serving Gateway (S-GW) in LTE.

When the mobile stations 5, 6 enter the communication coverage area of any one of the base stations, the mobile stations 5, 6 can communicate via radio with the base station serving that communication coverage area. When a radio link is established between the mobile stations 5, 6 and the serving base station, the uplink data transmitted from the mobile stations 5, 6 is relayed via the base station on to the upper node 4. The upper node 4 performs routing and transmits the received uplink data, for example, over the core network, to another upper node (not depicted). When the downlink data from that other upper node is received over the core network, the upper node 4 transmits the received downlink data to the mobile stations 5,6 via the base station to which the mobile stations 5, 6 are linked via radio.

For example, in FIG. 1, the mobile station 5 is linked via radio to the femto base station 3, while on the other hand, the mobile station 6 is linked via radio to the macro base station 2.

The macro base station 2 has a relatively wide communication coverage area (for example, ranging from several hundred meters to a dozen or so kilometers in radius). The macro base station 2 divides its communication coverage area into a plurality of sectors. Alternatively, the macro base station 2 may set up its entire communication coverage area as one sector. The macro base station 2 defines one or more cells within each sector by allocating one or more radio frequencies to each sector.

On the other hand, the femto base station 3 has a communication coverage area (for example, several tens of meters in radius) smaller than that of the macro base station, and is installed, for example, in indoor or underground premises. The femto base station 3 sets up its entire communication coverage area as one sector by using one radio frequency over its entire communication coverage area.

Further, as illustrated in FIG. 1, the area that the cell 201 defined by the macro base station 2 covers overlaps at least partially with the area that the cell 301 defined by the femto base station 3 covers.

As a result, when the macro base station 2 and the femto base station 3 are communicating with the mobile stations by using radio signals of the same radio frequency, the radio signals transmitted from other apparatus may interfere with each other at the mobile station or at the macro base station or the femto base station.

In the mobile communication system 1, if the degradation of the communication conditions caused by radiowave interference is detected by the macro base station 2, a radio frequency change process is performed in order to change the radio frequency of the carrier wave that the femto base station 3 uses for communication.

Figure 2:
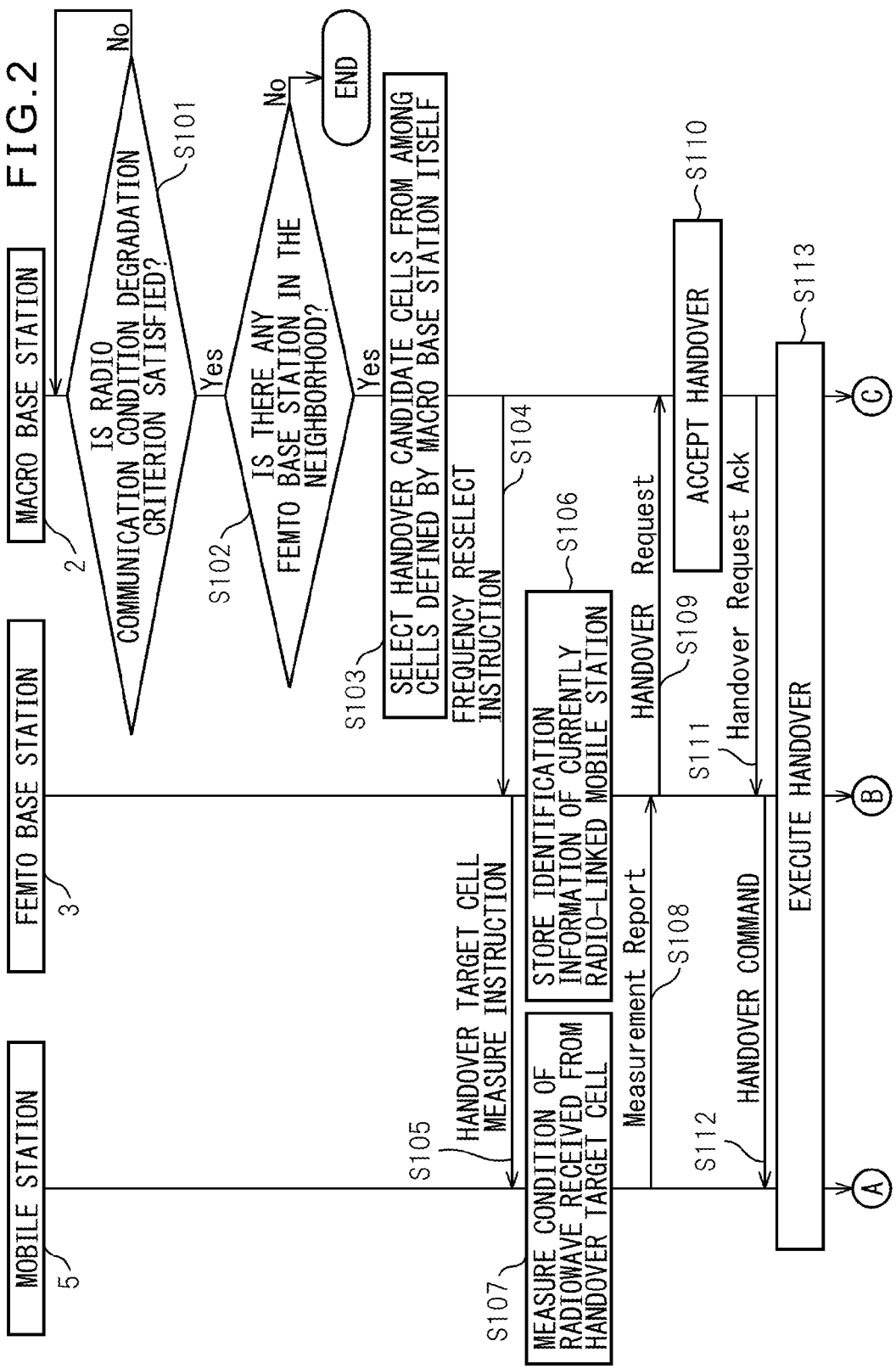
FIG. 2 is an operation sequence diagrams of a radio frequency change process.
Figure 3:
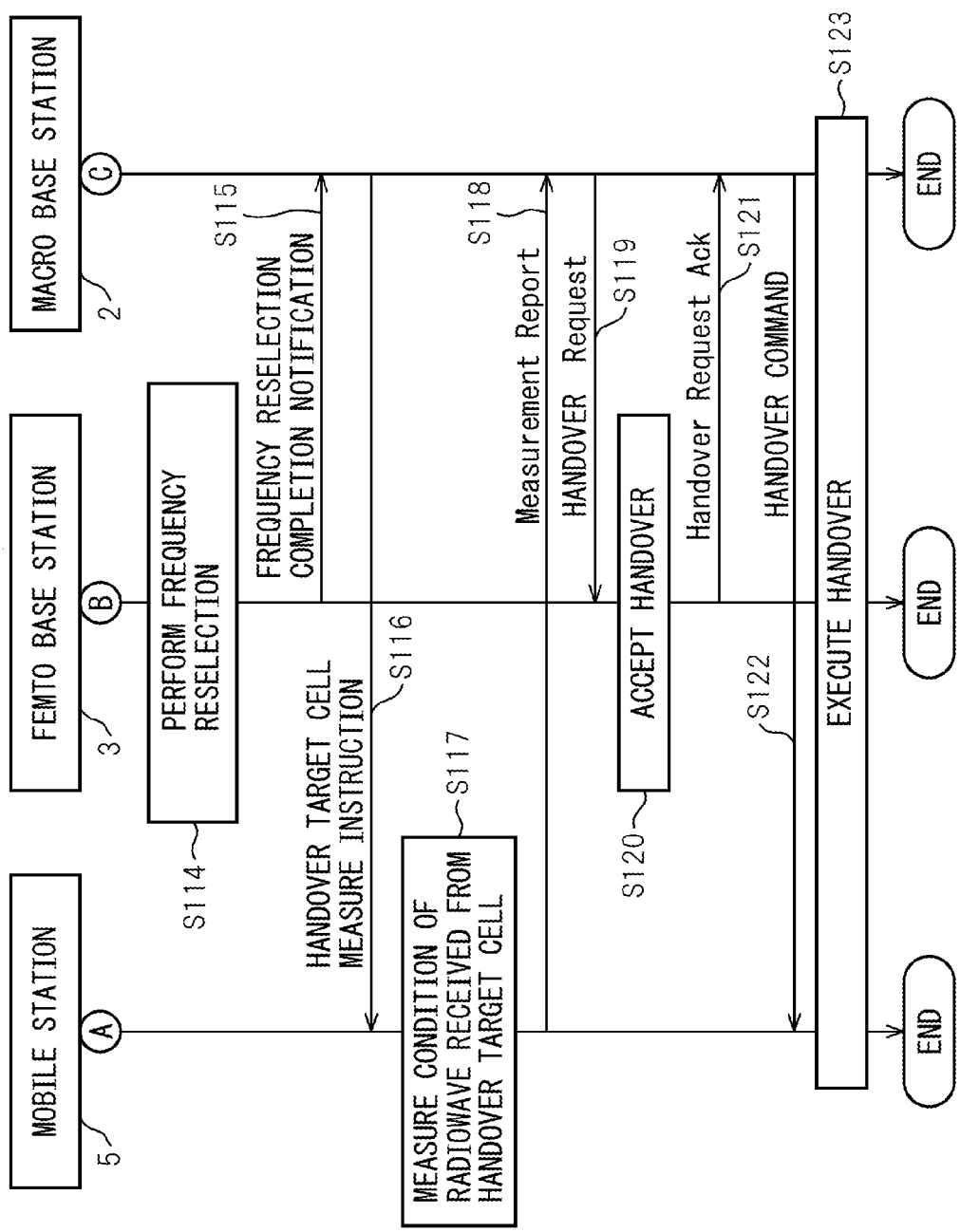
FIG. 3 is an operation sequence diagrams of the radio frequency change process.

FIGS. 2 and 3 are operation sequence diagrams illustrating the radio frequency change process performed in the mobile communication system 1.

The macro base station 2 determines whether or not a radio communication condition degradation criterion is satisfied which provides a trigger for the femto base station 3 to change the radio frequency it uses (step S101).

The macro base station 2 determines whether the radio communication conditions have degraded or not, based, for example, on a communication condition indicating signal received from the mobile station 6 linked via radio to the macro base station 2. The macro base station 2 uses, for example, the following three criteria as the degradation criteria. If any one of the criteria is satisfied, the macro base station 2 determines that the degradation criterion is satisfied.

(a) Degradation criterion 1: The mobile station linked via radio to the macro base station 2 fails to accomplish call control.

If a message indicating the occurrence of a failure in the call control sequence is received from the mobile station linked via radio to the macro base station 2, the macro base station 2 determines that the above criterion is satisfied. The failure indicating message includes, for example, Connection Reconfiguration Failure, Connection Reestablishment Reject, Handover Preparation Failure, Handover Failure, etc., defined in the Radio Resource Control (RRC) protocol.

(b) Degradation criterion 2: The quality degradation report value received from the mobile station indicates a higher degree of degradation than that defined by a certain threshold value.

If the radiowave quality report parameter representing the quality of the radiowave received from the macro base station 2 by the mobile station 6 linked via radio to the macro base station 2 indicates a higher degree of degradation than that defined by a certain threshold value, the macro base station 2 determines that the above criterion is satisfied.

The radiowave quality report parameter may be, for example, a parameter such as Ec/NO or Received Signal Code Power (RSCP) of the common pilot channel (CPICH) or a parameter such as Pathloss. These parameters are carried in a Measurement Report message that the mobile station sends to the base station in accordance with the RRC protocol.

Further, the threshold value may be varied according to the service provided in the region where the macro base station 2 or the femto base station 3 is installed. For example, the threshold value may be set to a value corresponding to the radiowave quality that may be necessary to achieve the minimum allowable communication speed for the communication service provided in the region where the macro base station 2 or the femto base station 3 is installed. As an example, the threshold value for CPICH Ec/NO may be set to 35 [dB]. On the other hand, the threshold value for CPICH RSCP may be set, for example, to −50 [dB]. Further, the threshold value for Pathloss may be set, for example, to 60 [dB].

(c) Degradation criterion 3: The call control failure rate managed by the macro base station 2 exceeds an allowable value.

For example, for each type of call control, the macro base station 2 stores in its storing unit the number of times a call control related message was received and the number of times a call control failure message was received during a predefined period of time. Then, if the percentage that the number of times the call control failure message was received accounts for in the total number of times the call control related message was received for each type of call control exceeds a certain allowable failure rate, the macro base station 2 determines that the above criterion is satisfied.

The certain allowable failure rate may be varied according to the service provided in the region where the macro base station 2 or the femto base station 3 is installed. As an example, the certain allowable failure rate may be set to 1% in the case of call initiation and to 2% in the case of handover. The predefined period of time may be, for example, the immediately preceding one-minute period.

The macro base station 2 may employ other degradation criteria than those described above. For example, the macro base station 2 may determine that the degradation criterion is satisfied, if the number of times the radiowave quality report parameter value as the degradation criterion 2 has dropped below the certain threshold value has reached or exceeded a certain number of times. Further, the macro base station 2 may determine that the degradation criterion is satisfied, if the quality of the signal received from any one of the mobile stations linked via radio to it is lower than a certain threshold value. The signal quality may be represented, for example, by the signal-to-interference ratio (SIR). Further, the certain threshold value may be set, for example, equal to the minimum value of the signal quality that may be necessary to maintain the radio link with the mobile station. It will also be recognized that the macro base station 2 may use only one or two of the above degradation criteria.

If the radio communication condition degradation criterion is not satisfied (No in step S101), the macro base station 2 repeats the process of step S101.

On the other hand, if the radio communication condition degradation criterion is satisfied (Yes in step S101), there is the possibility that radiowave interference has occurred. Therefore, the macro base station 2 proceeds to determine whether there is any femto base station 3 in the neighborhood that is using the same radio frequency as the radio frequency currently used for communication with the mobile station whose radio communication quality has degraded (step S102). For example, the macro base station 2 acquires in advance, from the upper node 4, cell information of the femto base station 3 that forms a cell whose coverage area overlaps at least partially with the area of any one of the cells defined by the macro base station 2. The cell information contains identification information of the cell formed by the femto base station 3, information indicating the area of the cell, and information indicating the radio frequency used in that cell. Then, the macro base station 2 stores in its storing unit the cell information of the femto base station 3. By referring to the cell information of the femto base station 3, the macro base station 2 identifies the radio frequency used by the femto base station 3. If the identified radio frequency is the same as the radio frequency used in the cell serving the mobile station that transmitted the signal used for judging the communication condition degradation criterion, then the macro base station 2 can determine that the femto base station 3 is located in the neighborhood.

Alternatively, the macro base station 2 may request the upper node 4 for the cell information of the femto base station. In this case, the macro base station 2, for example, sends its identification information and installation location information to the upper node 4. The upper node 4 identifies any femto base station whose installation location is within a certain distance from the installation location of the macro base station 2. Then, the upper node 4 sends the cell information of the identified femto base station to the macro base station 2. The certain distance may be given as the sum of the maximum distance within which the macro base station 2 can communicate with the mobile station and the maximum distance within which the femto base station 3 can communicate with the mobile station.

If the femto base station 3 is not located in the neighborhood (No in step S102), the cause for the degraded radiowave communication conditions is not the radiowave transmitted out from the femto base station 3; therefore, the macro base station 2 terminates the radio frequency change process.

On the other hand, if the femto base station 3 is located in the neighborhood (Yes in step S102), there is the possibility that the cause for the degraded radiowave communication conditions is the radiowave interference caused by the radiowave transmitted from the femto base station 3 or by the radiowave transmitted from the mobile station 5 radio-linked to the femto base station 3. Then, the macro base station 2 selects, from among its own cells, one or more handover candidate cells to which the mobile station 5 currently radio-linked to the femto base station 3 is to be temporarily handed over (step S103).

The macro base station 2 generates a frequency reselect instruction message which carries the identification information of the handover candidate cells. Then, the macro base station 2 sends the frequency reselect instruction message to the femto base station 3 in accordance with the X2 interface (step S104).

Figure 4:
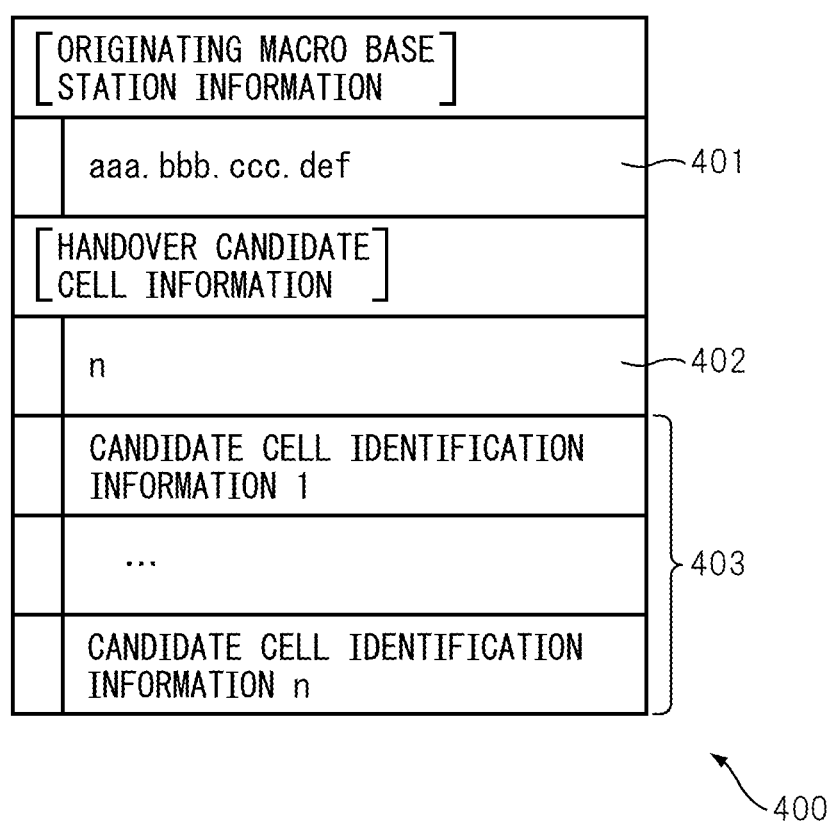
FIG. 4 is a diagram illustrating the format of a frequency reselect instruction message.

FIG. 4 is a diagram illustrating the format of the frequency reselect instruction message. The frequency reselect instruction message 400 carries (401) network address of the macro base station as the originator of the message, (402) total number of handover candidate cells, and (403) identification information of each individual handover candidate cell. The frequency reselect instruction message may carry, in addition to the identification information of each individual handover candidate cell, the information indicating the radio frequency used in each handover candidate cell.

Turning back to FIG. 2, the femto base station 3 that received the frequency reselect instruction message generates a radiowave quality measurement instruction message that carries the identification information of the handover candidate cell and the information indicating the radio frequency used in the handover candidate cell.

The femto base station 3 identifies the radio frequency used in the handover candidate cell, for example, by referring to macro cell information, i.e., information concerning the macro cell that is defined by the macro base station 2 and that overlaps at least partially with the communication area of the cell defined by the femto base station 3.

The macro cell information contains identification information for identifying the macro cell, information indicating the area of the macro cell, and information indicating the radio frequency used in the macro cell. The femto base station 3 acquires such macro cell information from the upper node 4 at the time of power-on or at certain intervals of time. Then, the femto base station 3 stores the macro cell information in its storing unit.

The femto base station 3 sends the radiowave quality measurement instruction message to every mobile station 5 currently radio-linked to the femto base station 3 (step S105). The radiowave quality measurement instruction message may be, for example, an RRC Measurement Control message which is transmitted over a dedicated control channel (DCCH).

Further, the femto base station 3 stores in its storing unit the information for identifying each mobile station 5 currently radio-linked to it (step S106).

Each mobile station 5 currently radio-linked to the femto base station 3 receives the radiowave quality measurement instruction message, and identifies the handover candidate cell by referring to the radio frequency information of the handover candidate cell carried in the message. Then, each mobile station 5 measures the condition of the radiowave received from the handover candidate cell (step S107). For example, each mobile station 5 measures the SIR, based on the reception strength of a reference signal that the macro base station 2 transmitted on a synchronization channel (SCH) from the handover candidate cell. Each mobile station 5 then confirms that it can still receive the downlink signal from the macro base station 2 if a handover is made to the handover candidate cell.

Each mobile station 5 returns the result of the received radiowave condition measured on the handover candidate cell to the femto base station 3 (step S108). For example, each mobile station 5 sends a Measurement Report, one of Radio Resource Control (RRC) messages, to the femto base station 3 by including the measurement result therein.

The femto base station 3 that received the measurement result of the received radiowave condition sends a HANDOVER Request command to the macro base station 2 in accordance with the X2 interface to initiate a handover (step S109). If there is more than one handover candidate cell, the femto base station 3 refers to the measurement result of the radiowave reception quality received from each mobile station 5, and selects the handover candidate cell providing the highest radiowave reception quality on average. Then, the femto base station 3 reports the selected handover candidate cell to the macro base station 2 by including the identification information of the selected handover candidate cell in the HANDOVER Request command.

The macro base station 2 accepts to execute the handover (step S110). Then, the macro base station 2 returns a Handover Request Ack message to the femto base station 3, notifying that it has accepted to execute the handover (step S111). The femto base station 3 that received the Handover Request Ack message sends a HANDOVER COMMAND to the mobile station 5 (step S112).

Then, the handover is executed (step S113), and each mobile station 5 radio-linked to the femto base station 3 is thus handed over to the designated handover candidate cell and radio-linked to the macro base station 2.

As illustrated in FIG. 3, after all the mobile stations 5 have been handed over, the femto base station 3 performs frequency reselection to reselect the radio frequency that is least likely to cause radiowave interference (step S114). The details of the frequency reselection process will be described later.

After completing the frequency reselection, the femto base station 3 retrieves from its storing unit the identification information of each mobile station 5 that was radio-linked to the femto base station 3 at the time of the reception of the frequency reselect instruction message. Then, the femto base station 3 generates a frequency reselection completion notification message which indicates the completion of the frequency reselection and which carries information concerning the cell corresponding to the reselected radio frequency and information for identifying each mobile station 5. The femto base station 3 sends the frequency reselection completion notification message to the macro base station 2 in accordance with the X2 interface (step S115).

Figure 5:
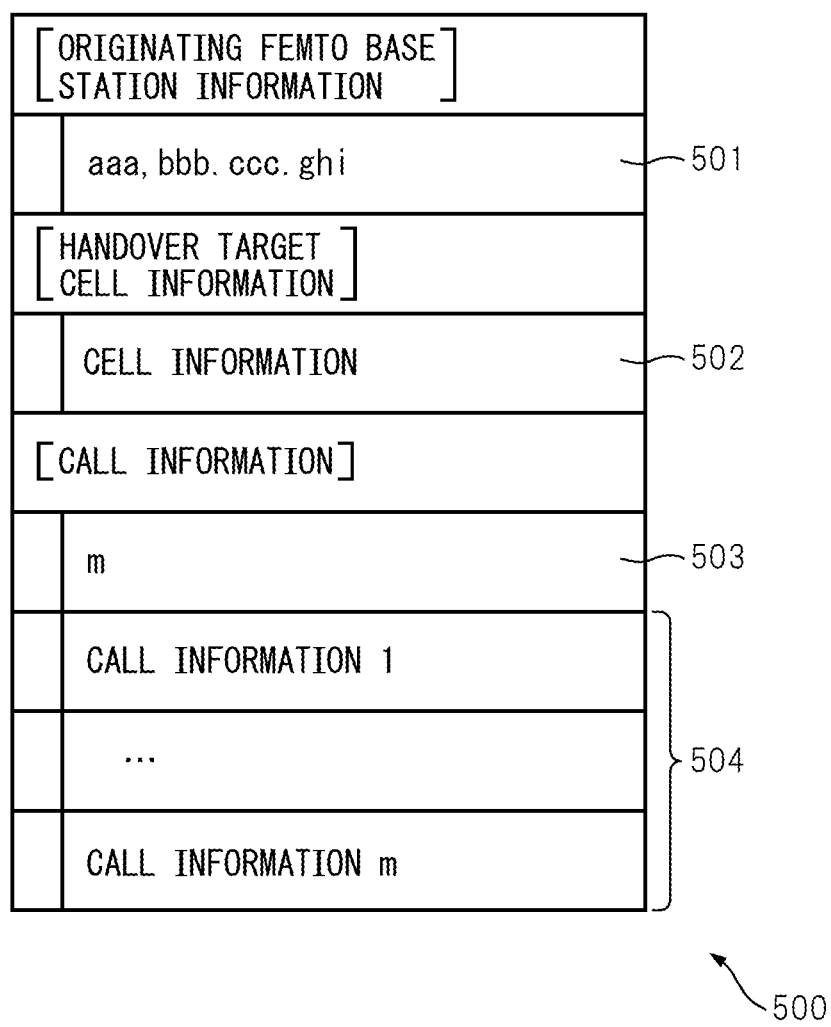
FIG. 5 is a diagram illustrating the format of a frequency reselection completion notification message.

FIG. 5 is a diagram illustrating the format of the frequency reselection completion notification message. The frequency reselection completion notification message 500 carries (501) network address of the femto base station 3 as the originator of the message, (502) handover target cell information, (503) total number of mobile stations to be handed over to the handover target cell, and (504) call information for identifying each individual mobile station. The handover target cell information 502 contains information indicating the reselected radio frequency and identification information of the cell corresponding to the reselected radio frequency. On the other hand, the call information 504 is information for identifying each individual mobile station and has a value uniquely assigned to each mobile station. For example, an International Mobile Subscriber Identity (IMSI) or a Temporal Mobile Subscriber Identity (TMSI) may be used as the call information 504. The frequency reselection completion notification message 500 may include as the call information 504 the telephone number of each mobile station to be reconnected to the femto base station 3.

The macro base station 2 that received the frequency reselection completion notification message sends a target cell radiowave quality measurement instruction message, which carries the identification information of the handover target cell, to each mobile station 5 specified in the frequency reselection completion notification message (step S116). Further, the macro base station 2 stores in its storing unit the handover target cell information extracted from the frequency reselection completion notification message.

Each mobile station 5 that received the radiowave quality measurement instruction message measures the condition of the radiowave received from the handover target cell (step S117). For example, each mobile station 5 measures the SIR, based on the reception strength of the SCH reference signal that the femto base station 3 transmitted from the handover target cell. Each mobile station 5 then confirms that it can still receive the downlink signal from the femto base station 3 if a handover is made to the target cell.

Each mobile station 5 then returns the measurement result of the received radiowave condition to the macro base station 2 (step S118). For example, each mobile station 5 sends a Measurement Report by including the measurement result therein.

The macro base station 2 that received the measurement result of the received radiowave condition from each mobile station 5 sends a HANDOVER Request command to the femto base station 3 in accordance with the X2 interface to initiate a handover (step S119).

The femto base station 3 accepts to execute the handover (step S120). Then, the femto base station 3 returns a Handover Request Ack message to the macro base station 2, notifying that it has accepted to execute the handover (step S121). The macro base station 2 that received the Handover Request Ack message sends a HANDOVER COMMAND to the mobile station 5 (step S122).

Then, the handover is executed (step S123), and all the mobile stations 5 temporarily radio-linked to the macro base station 2 are reconnected via radio to the femto base station 3.

After step S123, the mobile communication system 1 terminates the radio frequency change process.

After the radio frequency change process is completed, each mobile station 5 can communicate with the femto base station 3 by using the carrier wave having a radio frequency different from the radio frequency that was used before the initiation of the radio frequency change process.

In the above operation sequence, the process of steps S105, S107, and S108 may be omitted. The handover candidate cell has been selected by the macro base station 2 as a cell to which it is expected that a radio link can be readily established. Accordingly, even if the mobile station does not confirm the condition of the radiowave received from the handover candidate cell, the handover to the candidate cell will succeed with high probability. In this case, if two or more cells have been selected as handover candidate cells, the femto base station 3 arbitrarily selects one handover candidate cell from among the handover candidate cells. Alternatively, the femto base station 3 may select more than one handover candidate cell. Then, the femto base station 3 may hand over a certain number of mobile stations to each selected handover candidate cell. For a similar reason, the process of steps S116 to S118 may also be omitted.

A specific example of the radio frequency change process will be described below with reference to FIGS. 6 to 9. In FIGS. 6 to 9, the same or similar elements are designated by like reference numerals.

Figure 6:
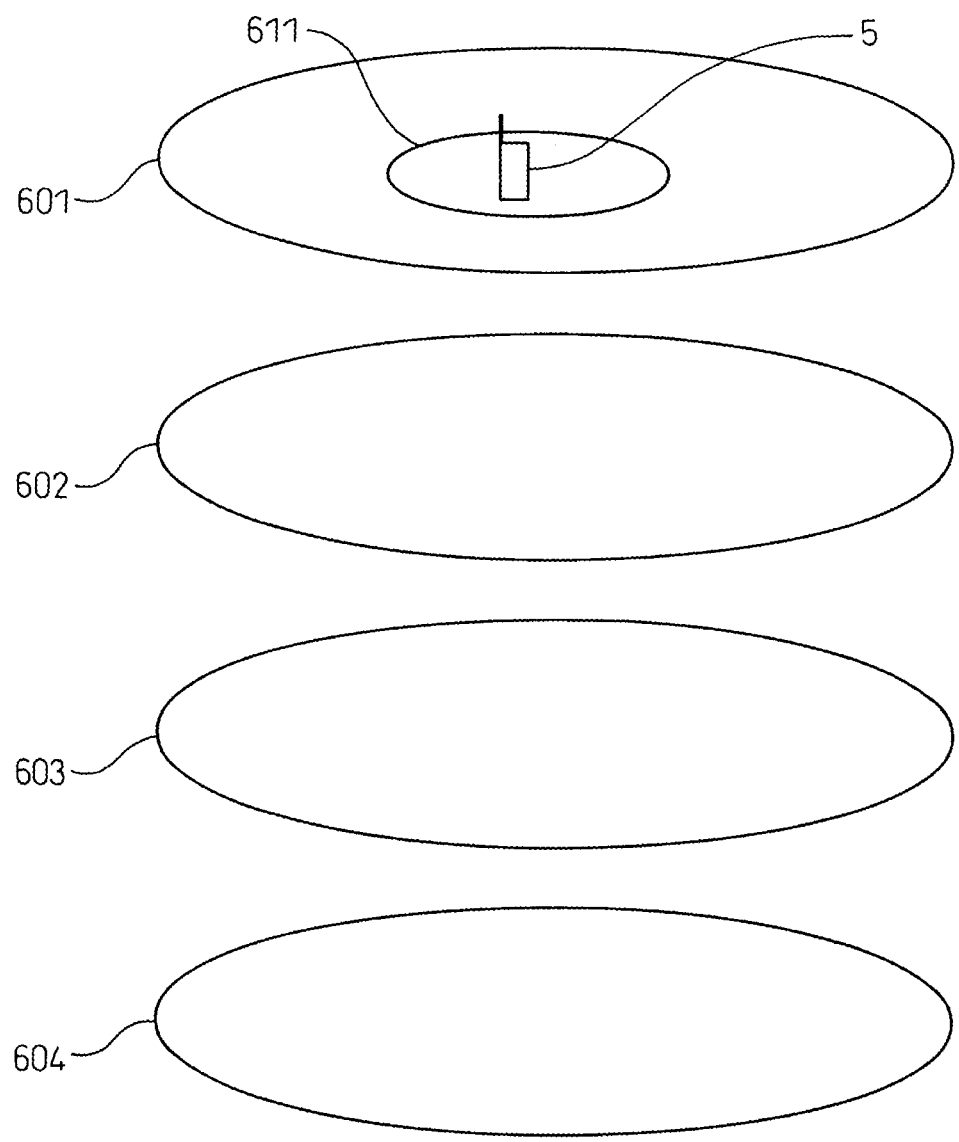
FIG. 6 is a diagram illustrating one example of the arrangement of cells and the location of a mobile station before a radio frequency is changed.

FIG. 6 is a diagram illustrating one example of the arrangement of the cells and the location of the mobile station 5 before the radio frequency is changed. In FIG. 6, the femto cell 611 is the cell defined by the femto base station 3. On the other hand, the macro cells 601 to 604 are the cells defined by the macro base station 2, each of which may overlap at least partially with the femto cell 611. In the macro cell 601, the radio frequency of the uplink carrier is 1940 MHz, and the radio frequency of the downlink carrier is 2140 MHz. On the other hand, in the macro cell 602, the radio frequency of the uplink carrier is 1950 MHz, and the radio frequency of the downlink carrier is 2150 MHz. Likewise, in the macro cell 603, the radio frequency of the uplink carrier is 1960 MHz, and the radio frequency of the downlink carrier is 2160 MHz. Further, in the macro cell 604, the radio frequency of the uplink carrier is 1970 MHz, and the radio frequency of the downlink carrier is 2170 MHz.

In the femto cell 611, the radio frequencies of the uplink and downlink carriers are respectively the same as the radio frequencies of the uplink and downlink carriers in the macro cell 601.

The mobile station 5 belongs to the femto cell 611, and is linked via radio to the femto base station 3.

In the situation depicted in FIG. 6, it is assumed that the macro base station 2 detects a degradation of the communication conditions and selects the macro cells 602 and 603 as handover candidate cells. In this case, the macro base station 2 sends the femto base station 3 a frequency reselect instruction message which carries the identification information of the handover candidate cells 602 and 603. The femto base station 3 instructs the mobile station 5 to measure the condition of the radiowave received from each of the handover candidate cells 602 and 603. The mobile station 5 in response measures the condition of the radiowave received from each of the handover candidate cells 602 and 603. The femto base station 3 then selects the macro cell 602 as the handover target cell, and reports the result to the macro base station 2.

After that, the mobile station 5 is handed over from the femto cell 611 to the macro cell 602.

Figure 7:
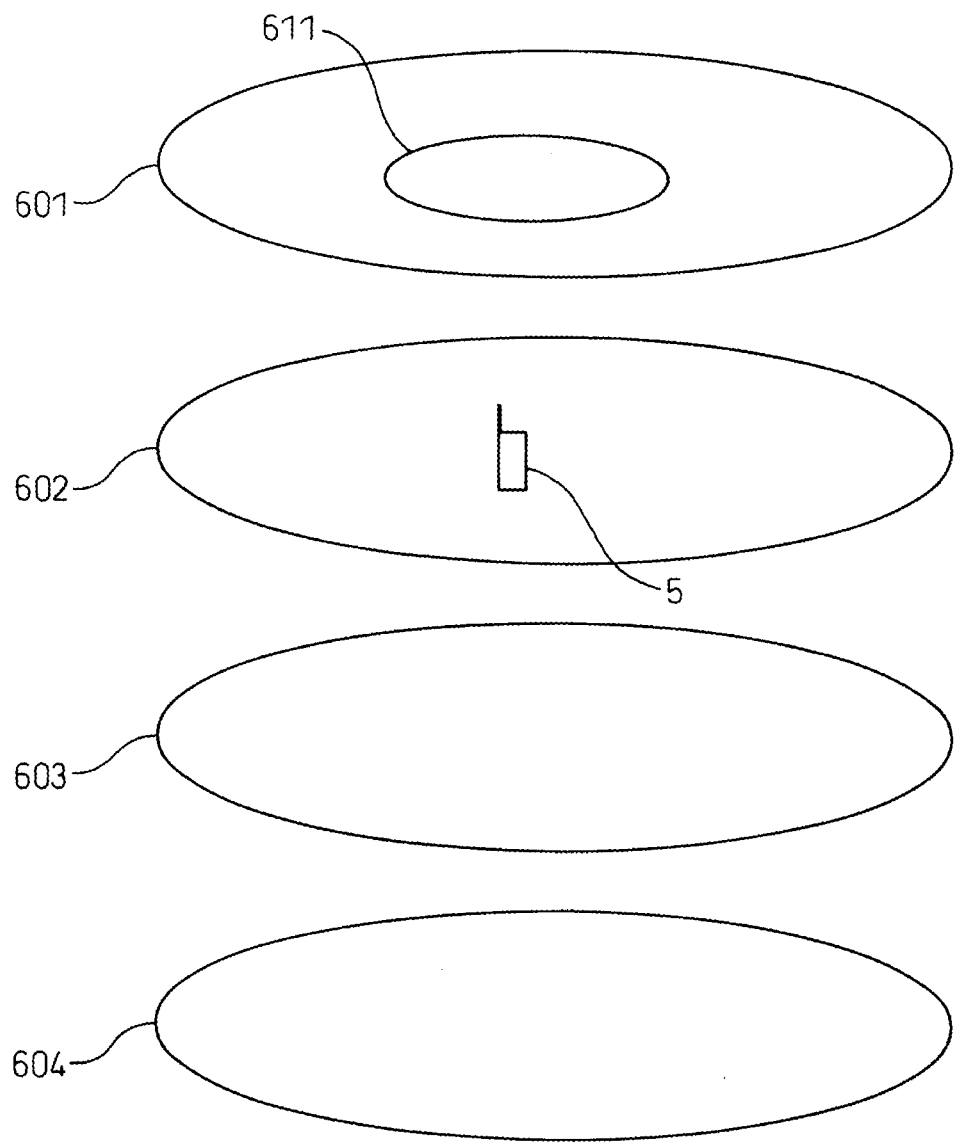
FIG. 7 is a diagram illustrating one example of the arrangement of the cells and the location of the mobile station after the mobile station is handed over to a handover candidate cell.

FIG. 7 is a diagram illustrating one example of the arrangement of the cells and the location of the mobile station 5 after the mobile station 5 is handed over to the handover candidate cell. In this situation, the mobile station 5 belongs to the macro cell 602, and is communicating with the macro base station 2 by using the carrier wave having the radio frequency allocated to the macro cell 602. On the other hand, there is no longer any mobile station belonging to the femto cell 611.

Therefore, the femto base station 3 can change the radio frequency to be used in its cell. Then, the femto base station 3 performs frequency reselection to reselect the radio frequency that minimizes the interfering signal detected at the femto base station 3. It is assumed that, as a result, the same radio frequency as that used in the macro cell 603 is selected.

Figure 8:
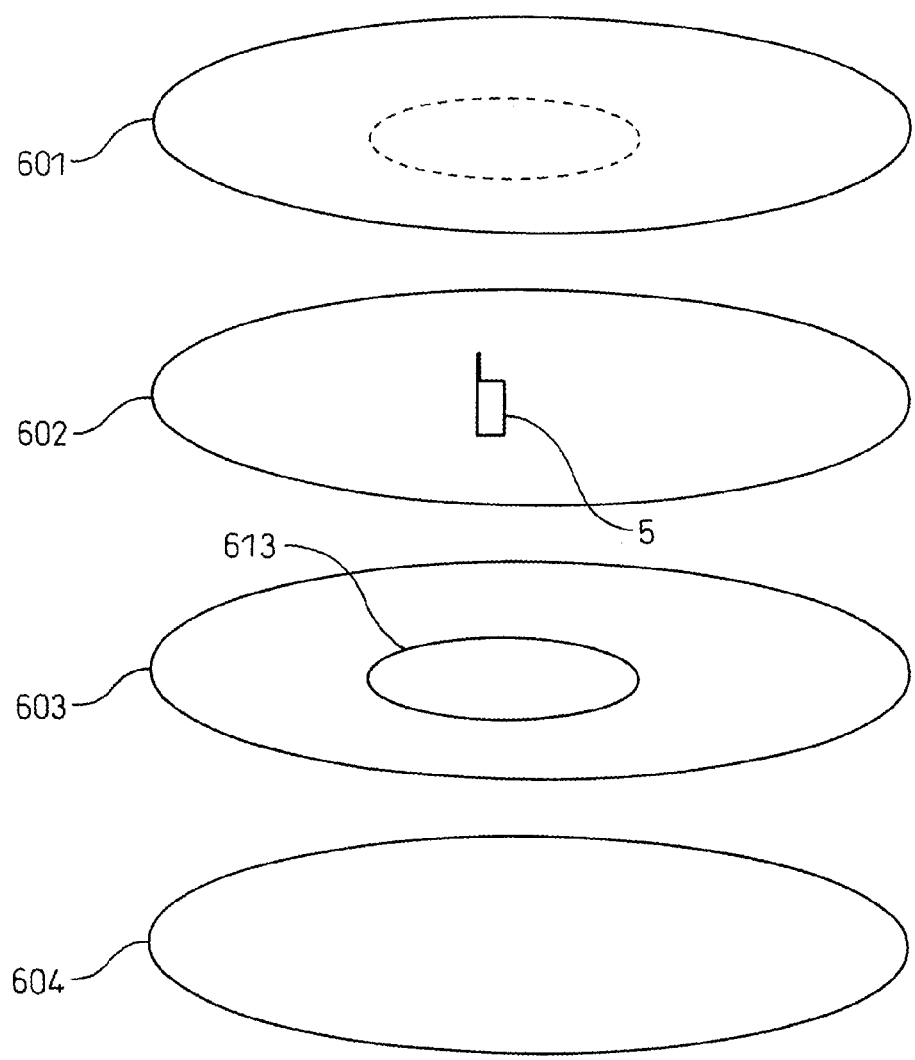
FIG. 8 is a diagram illustrating one example of the arrangement of the cells and the location of the mobile station after the radio frequency is changed.

FIG. 8 is a diagram illustrating one example of the arrangement of the cells and the location of the mobile station 5 after the radio frequency is changed. As a result of the frequency reselection, the femto base station 3 changes the radio frequency used for communication to the same radio frequency as that used in the macro cell 603 (i.e., changes the radio frequency of the uplink carrier to 1960 MHz and the radio frequency of the downlink carrier to 2160 MHz). Then, the femto base station 3 defines a femto cell 613 that uses the new radio frequency. Further, the femto base station 3 sends a frequency reselection completion notification message to the macro base station 2.

Figure 9:
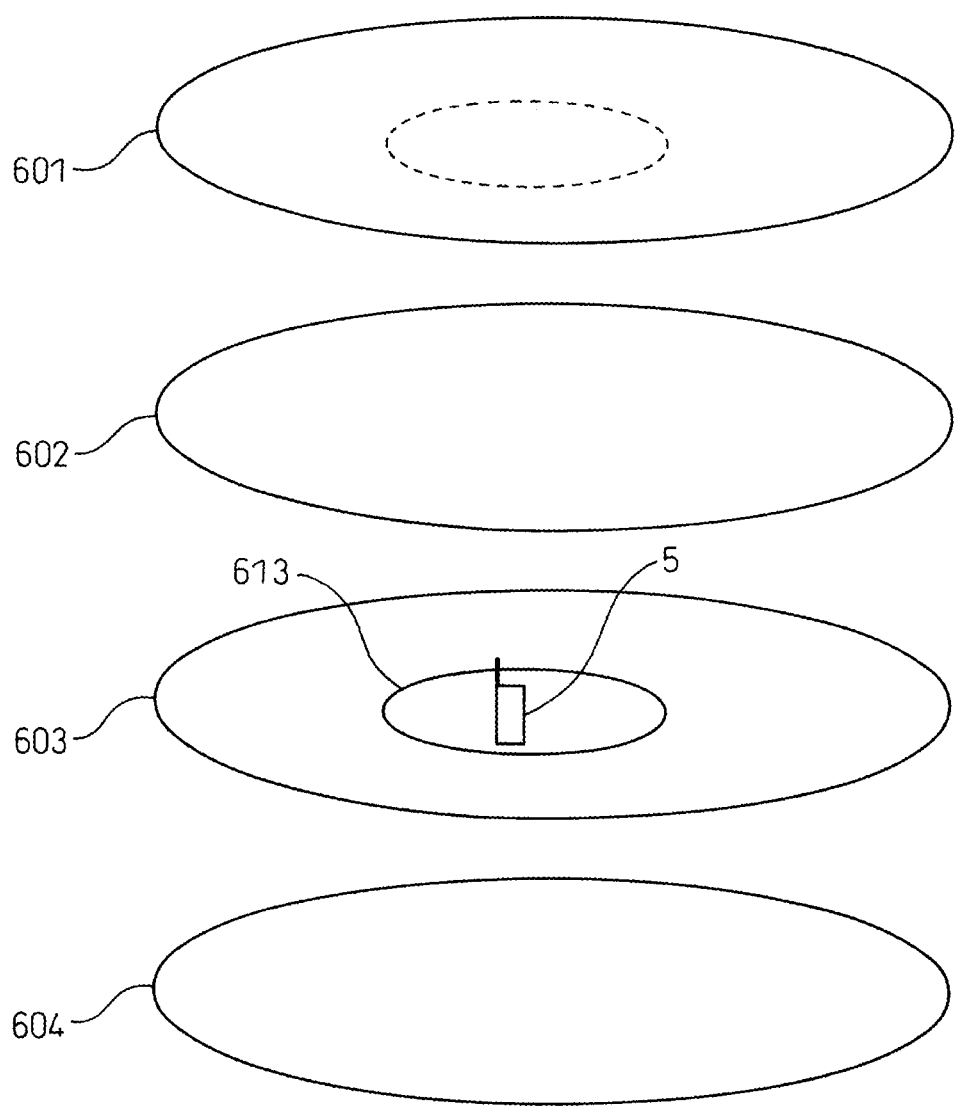
FIG. 9 is a diagram illustrating one example of the arrangement of the cells and the location of the mobile station after the mobile station is handed over to a femto cell whose radio frequency has been changed.

FIG. 9 is a diagram illustrating one example of the arrangement of the cells and the location of the mobile station 5 after the mobile station 5 is handed over to the femto cell whose radio frequency has been changed. After the macro base station 2 has received the frequency reselection completion notification message, the mobile station 5 is handed over from the macro cell 602 to the femto cell 613. The mobile station 5 is thus reconnected via radio to the femto base station 3 by using the radio frequency that minimizes the interference. The femto base station 3 and the mobile station 5 no longer use the radio frequency used in the macro cell 601. This also serves to reduce radiowave interference at the macro base station 2 and other base stations located in the macro cell 601.

The configuration of each apparatus in the mobile communication system 1 for implementing the above process will be described in detail below.

Figure 10:
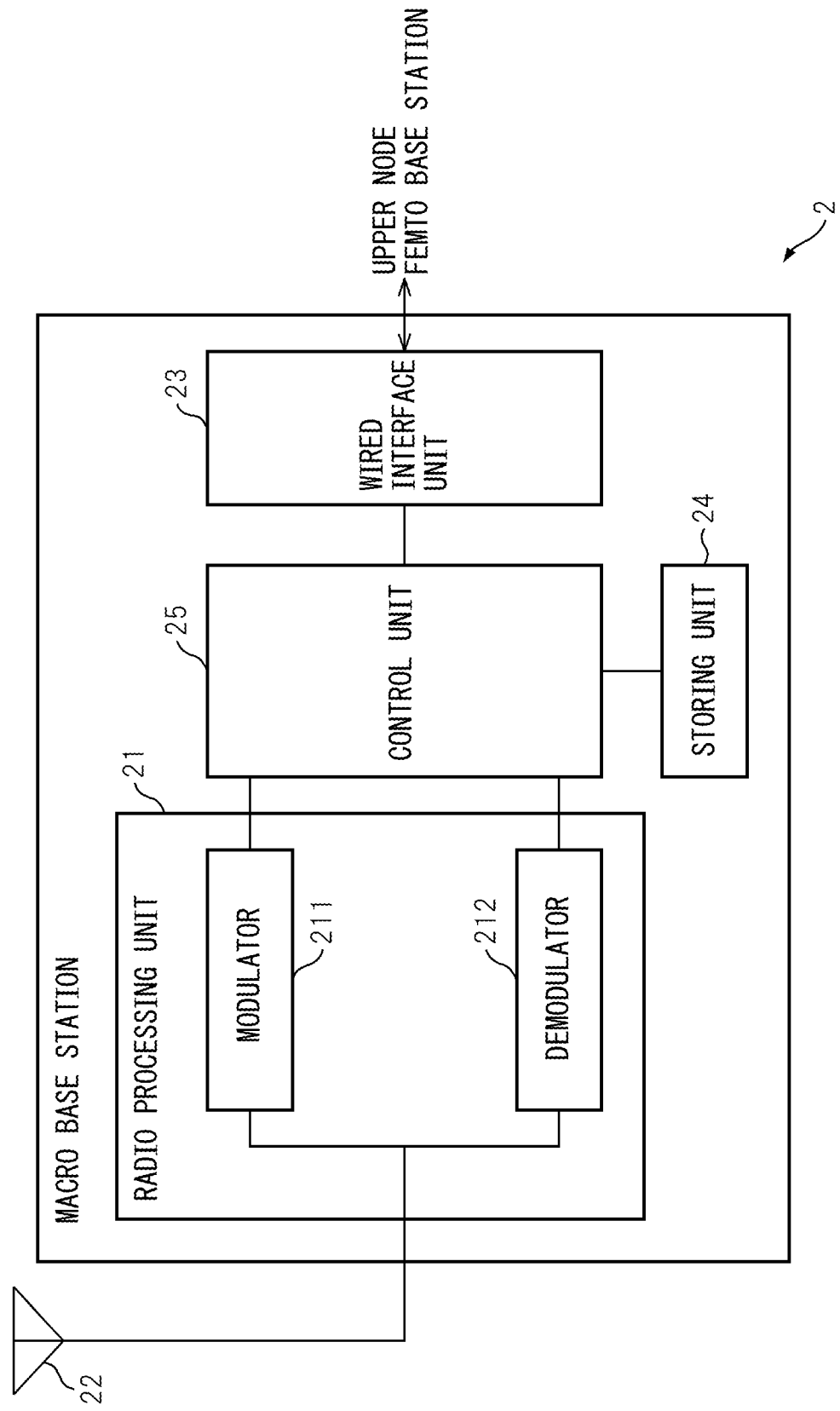
FIG. 10 is a diagram schematically illustrating the configuration of a macro base station.

FIG. 10 is a diagram schematically illustrating the configuration of the macro base station 2.

The macro base station 2 includes a radio processing unit 21, an antenna 22, a wired interface unit 23, a storing unit 24, and a control unit 25. The radio processing unit 21 includes a modulator 211 and a demodulator 212. The radio processing unit 21, the storing unit 24, and the control unit 25 are implemented as separate circuits. Alternatively, these units may be incorporated in the macro base station 2 as a single integrated circuit on which the circuits corresponding to the respective units are integrated.

The modulator 211 in the radio processing unit 21 receives a downlink signal from the control unit 25, and modulates and multiplexes the signal in accordance with a prescribed scheme. The prescribed modulation/multiplexing scheme is, for example, an orthogonal frequency-division multiplexing (OFDM) scheme. The modulator 211 superimposes the multiplexed downlink signal onto a carrier having the radio frequency specified by the control unit 25. Then, the modulator 211 amplifies the downlink signal and control signals, superimposed on the carrier, to a desired level by a high-power amplifier (not depicted), and passes them via a duplexer (not depicted) to the antenna 22.

On the other hand, the uplink signal received by the antenna 22 is passed via the duplexer to the demodulator 212 in the radio processing unit 21 and is amplified by a low-noise amplifier (not depicted). The demodulator 212 multiplies the amplified uplink signal by a periodic signal having an intermediate frequency and thereby converts the frequency of the uplink signal from the radio frequency to the baseband frequency. Then, the demodulator 212 demultiplexes the uplink signal in accordance with a prescribed multiplexing scheme, and demodulates the demultiplexed uplink signal. The demodulator 212 then passes the demultiplexed uplink signal to the control unit 25. A single carrier frequency division multiplexing (SC-FDMA) scheme, for example, may be employed as the multiplexing scheme for the uplink signal.

The downlink signal passed from the modulator 211 via the duplexer is radiated from the antenna 22.

On the other hand, the uplink signal transmitted from the mobile station is received by the antenna 22 and passed via the duplexer to the demodulator 212.

The wired interface unit 23 includes a communication interface for connecting the macro base station 2 to the upper node 4 and other base station. The wired interface unit 23 receives downlink data or control signals from the upper node 4 or other base station and passes the downlink data or control signals to the control unit 25. Further, the wired interface unit 23 receives uplink data or control signals from the control unit 25 and transmits the uplink data or control signals to the upper node 4 or other base station.

The storing unit 24 includes, for example, an alterable nonvolatile semiconductor memory. The storing unit 24 stores various kinds of information, such as the identification information of the macro base station 2 and the radio frequency used in each cell, that are used for controlling the radio connection with the mobile station. The storing unit 24 may also store temporarily the uplink data or downlink data.

Further, the storing unit 24 stores various kinds of data used for judging the degradation of the communication conditions, for example, the threshold values for the radiowave quality report parameters and the allowable failure rate of call control. The storing unit 24 also stores such information as the cell information of the femto base station installed in the neighborhood of the macro base station 2.

The control unit 25 includes, for example, one or a plurality of processors and their peripheral circuitry.

Figure 11:
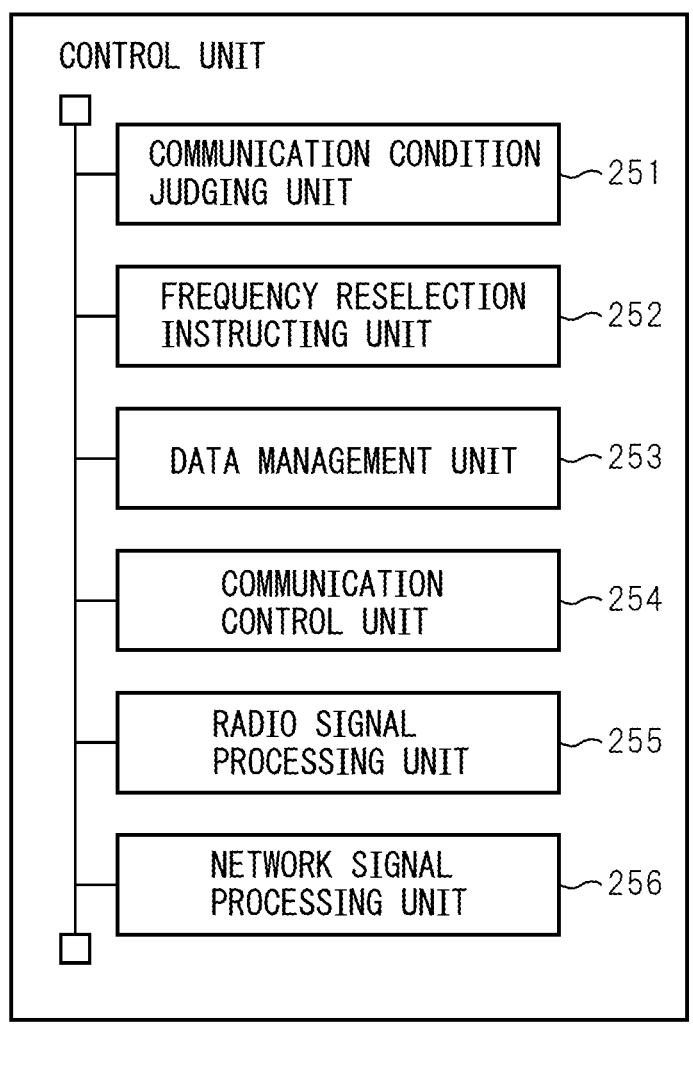
FIG. 11 is a block diagram of a control unit in the macro base station.

FIG. 11 is a block diagram of the control unit 25. The control unit 25 includes a communication condition judging unit 251, a frequency reselection instructing unit 252, a data management unit 253, a communication control unit 254, a radio signal processing unit 255, and a network signal processing unit 256. These processing units may be implemented as separate circuits.

The communication condition judging unit 251 judges whether or not the radio communication conditions have degraded at the macro base station 2 or at the mobile station (for example, the mobile station 6 in FIG. 1) radio-linked to the macro base station 2. More specifically, the communication condition judging unit 251 judges that the radio communication conditions have degraded, if at least one of the plurality of degradation criteria described above is satisfied. If it is judged that the radio communication conditions have degraded, the communication condition judging unit 251 notifies the frequency reselection instructing unit 252 of the degradation and of the information indicating the radio frequency used in the cell to which the affected mobile station belongs.

When notified of the degradation of the communication conditions, the frequency reselection instructing unit 252 refers to the storing unit 24 for the cell information of the femto base station 3 located in the neighborhood. Then, the frequency reselection instructing unit 252 checks to see if the radio frequency used in the cell to which the affected mobile station belongs is the same as the radio frequency used by the femto base station 3. If the radio frequencies are the same, the frequency reselection instructing unit 252 selects a handover candidate cell via which the mobile station currently radio-linked to the femto base station 3 can be temporarily radio-linked to the macro base station 2.

For example, to determine such a handover candidate cell, the frequency reselection instructing unit 252 refers, for example, to the cell information of the femto base station 3 located in the neighborhood. Then, the frequency reselection instructing unit 252 selects one or more cells whose areas each overlap at least partially with the cell defined by the femto base station 3 and whose radio frequencies used are different from each other. The frequency reselection instructing unit 252 selects, from among the selected cells, one or more handover candidate cells in sequence from the cell having the largest amount of unused resources or the cell serving the smallest number of mobile stations.

The frequency reselection instructing unit 252 generates a frequency reselect instruction message which carries the identification information of the handover candidate cells. Then, the frequency reselection instructing unit 252 passes the frequency reselect instruction message to the network signal processing unit 256.

If the radio frequency used in the cell to which the affected mobile station belongs is different from the radio frequency used by the femto base station 3, the frequency reselection instructing unit 252 need not select such handover candidate cells. In this case, the radio frequency change process is not executed, because the frequency reselect instruction message is not sent out to the femto base station 3.

The data management unit 253 manages the amount of resources used, the number of mobile stations being served, etc., for each cell defined by the macro base station 2.

The communication control unit 254 performs processing, such as location registration, call control, and handover, for the mobile station entering any cell defined by the macro base station 2 in order to establish a radio connection between the macro base station 2 and the mobile station. For example, after sending out the frequency reselect instruction message, the communication control unit 254 performs processing to hand over the mobile station 5, currently radio-linked to the femto base station 3, to the macro base station 2. Further, the communication control unit 254 creates a HANDOVER COMMAND to be sent to the mobile station 5 specified in the frequency reselection completion notification message, by including in the command the information which is carried in the frequency reselection completion notification message and indicates the radio frequency used in the cell defined by the femto base station 3. Then, the communication control unit 254 executes the handover to switch the connection of the mobile station 5 to the femto base station 3.

Further, the communication control unit 254 notifies the modulator 211 of the radio frequency used in each cell.

The communication control unit 254 may further perform processing, such as retransmission control and reordering, for transmission and reception of signals to and from the mobile station. The communication control unit 254 further performs transmit power control.

The communication control unit 254 generates control signals necessary for performing the above processing. Then, the communication control unit 254 passes to the radio signal processing unit 255 the control signals to be transmitted as radio signals. The communication control unit 254 passes to the network signal processing unit 256 the control signals to be transmitted to the upper node 4 or other base station.

The radio signal processing unit 255 applies transmission processing such as error-correction coding to the downlink data and control signals transferred from the network signal processing unit 256 for transmission to the mobile station. The radio signal processing unit 255 then passes the encoded downlink data to the modulator 211.

Further, the radio signal processing unit 255 receives the uplink signal transmitted from the mobile station and demodulated by the demodulator 212, and applies reception processing such as error-correction decoding to the received signal. The radio signal processing unit 255 then passes the uplink data contained in the decoded uplink signal to the network signal processing unit 256.

The network signal processing unit 256 converts the uplink data and control signals to be transmitted to the upper node 4 into a format conforming to the S1 interface. Further, the network signal processing unit 256 converts the data and control signals to be transmitted to other base station into a format conforming to the X2 interface. Then, the network signal processing unit 256 passes these signals to the wired interface unit 23.

Further, the network signal processing unit 256 receives a signal from the upper node 4 via the wired interface unit 23, analyzes the received signal in accordance with the S1 interface, and extracts the downlink data and control signals from the received signal. Likewise, the network signal processing unit 256 receives a signal from other base station via the wired interface unit 23, analyzes the received signal in accordance with the X2 interface, and extracts the data and control signals from the received signal.

Then, the network signal processing unit 256 passes the extracted data and control signals to the corresponding unit in the control unit 25 in accordance with the type thereof. For example, the network signal processing unit 256 passes the frequency reselection completion notification message received from the femto base station 3 to the communication control unit 254. Further, the network signal processing unit 256 passes the downlink data received from the upper node 4 to the radio signal processing unit 255.

Figure 12:
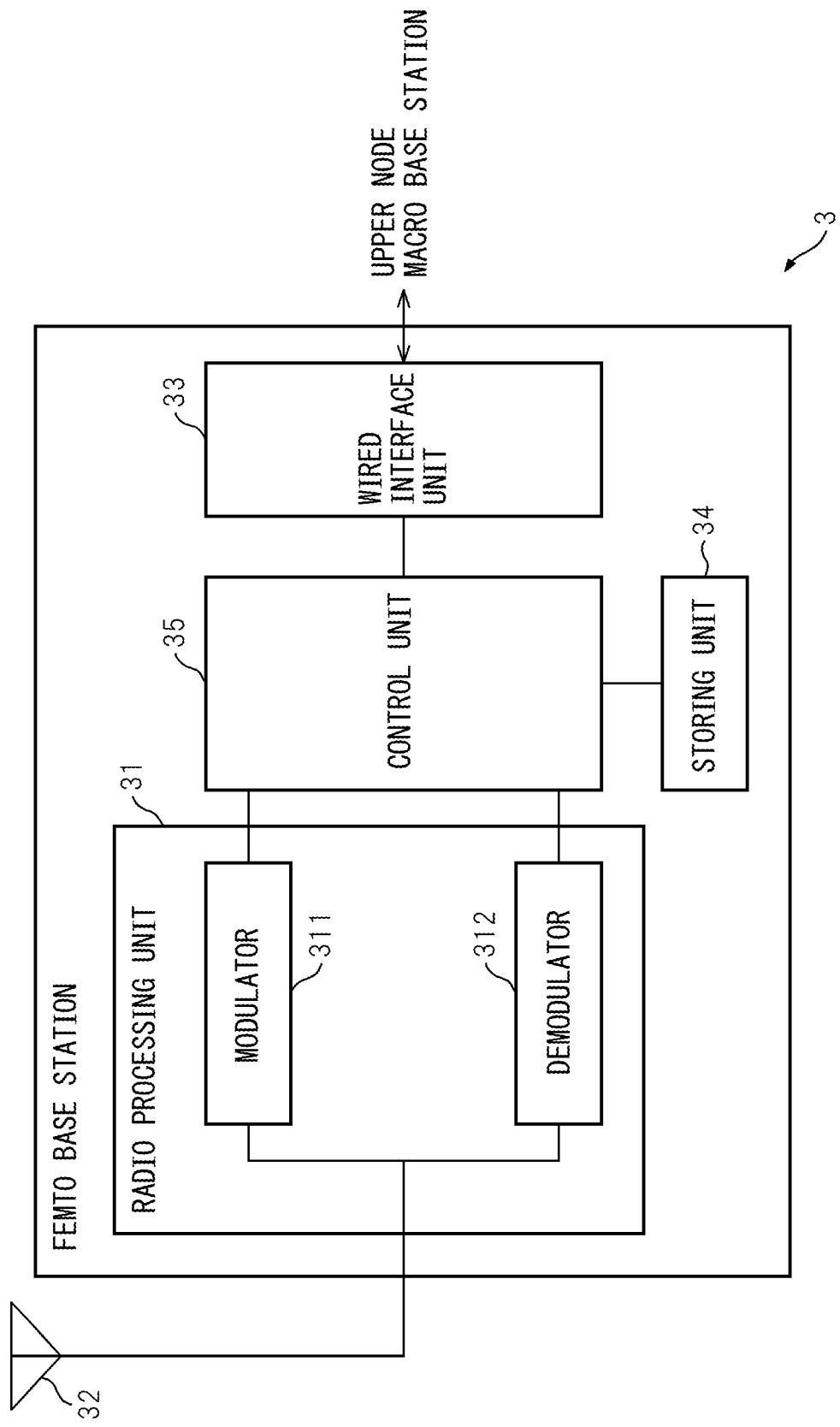
FIG. 12 is a diagram schematically illustrating the configuration of a femto base station.

FIG. 12 is a diagram schematically illustrating the configuration of the femto base station 3.

The femto base station 3 includes a radio processing unit 31, an antenna 32, a wired interface unit 33, a storing unit 34, and a control unit 35. The radio processing unit 31 includes a modulator 311 and a demodulator 312.

Each unit in the femto base station 3 is similar in function and configuration to the corresponding unit in the macro base station 2. However, the processing implemented by the control unit 35 of the femto base station 3 differs in part from that implemented by the control unit 25 of the macro base station 2. Therefore, the following describes the processing performed by the control unit 35 of the femto base station 3.

Figure 13:
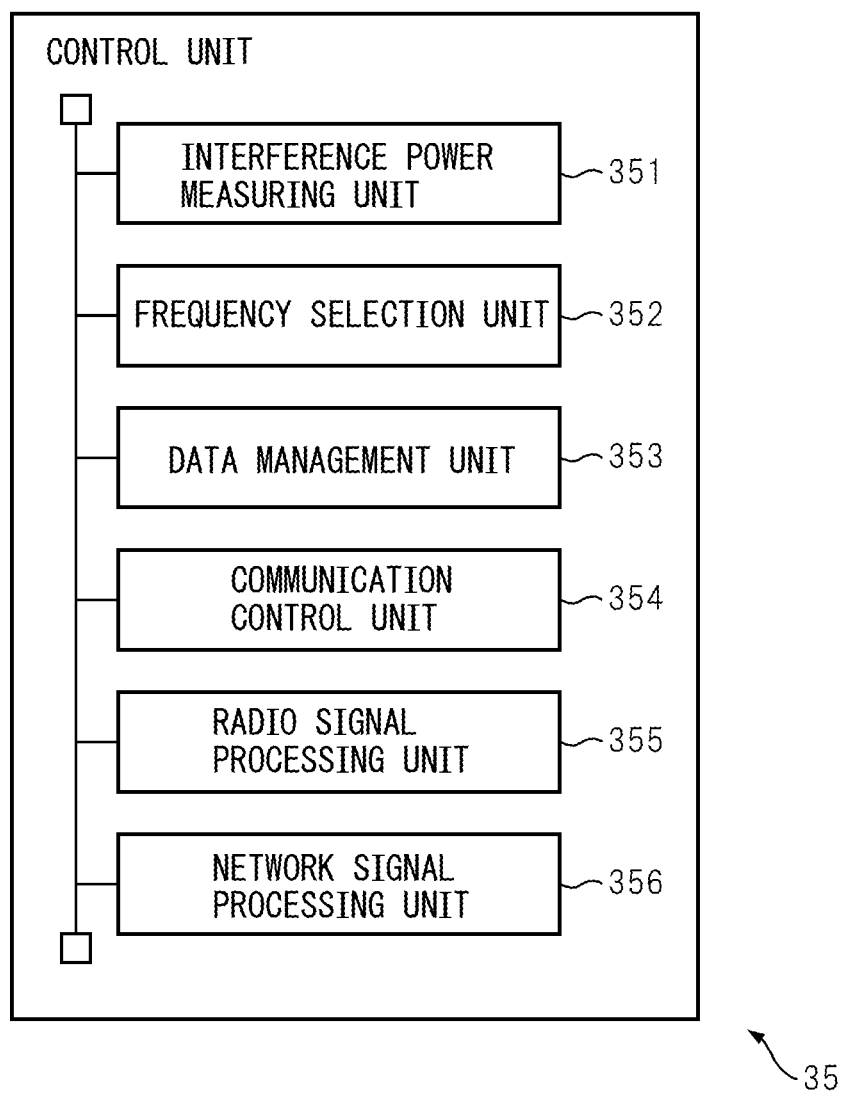
FIG. 13 is a block diagram of a control unit in the femto base station.

FIG. 13 is a block diagram of the control unit 35 of the femto base station 3. The control unit 35 includes an interference power measuring unit 351, a frequency selection unit 352, a data management unit 353, a communication control unit 354, a radio signal processing unit 355, and a network signal processing unit 356.

The data management unit 353, the communication control unit 354, the radio signal processing unit 355, and the network signal processing unit 356 are similar in function to the data management unit 253, the communication control unit 254, the radio signal processing unit 255, and the network signal processing unit 256, respectively, provided in the control unit 25 of the macro base station 2 depicted in FIG. 11. Therefore, of the functions implemented by the control unit 35, only those functions that differ from the functions of the control unit 25 of the macro base station 2 will be described below.

The interference power measuring unit 351 measures interference power at each of the radio frequencies that the femto base station 3 can use for communication with the mobile station. The radio frequencies that the femto base station 3 can use for communication with the mobile station will hereinafter be referred to as the candidate frequencies. For example, for each candidate frequency, the interference power measuring unit 351 obtains from the demodulated radio frequency the variance of a specific signal (for example, a pilot symbol) contained in a specific time slot. Then, the interference power measuring unit 351 obtains the interference power value by averaging the variance over a plurality of time slots containing the specific signals.

The interference power measuring unit 351 reports the obtained interference power value to the frequency selection unit 352 along with the corresponding candidate frequency.

The frequency selection unit 352 selects, from among the plurality of candidate frequencies, the radio frequency to be used in the cell defined by the femto base station 3 after the execution of the radio frequency reselection process.

Figure 14:
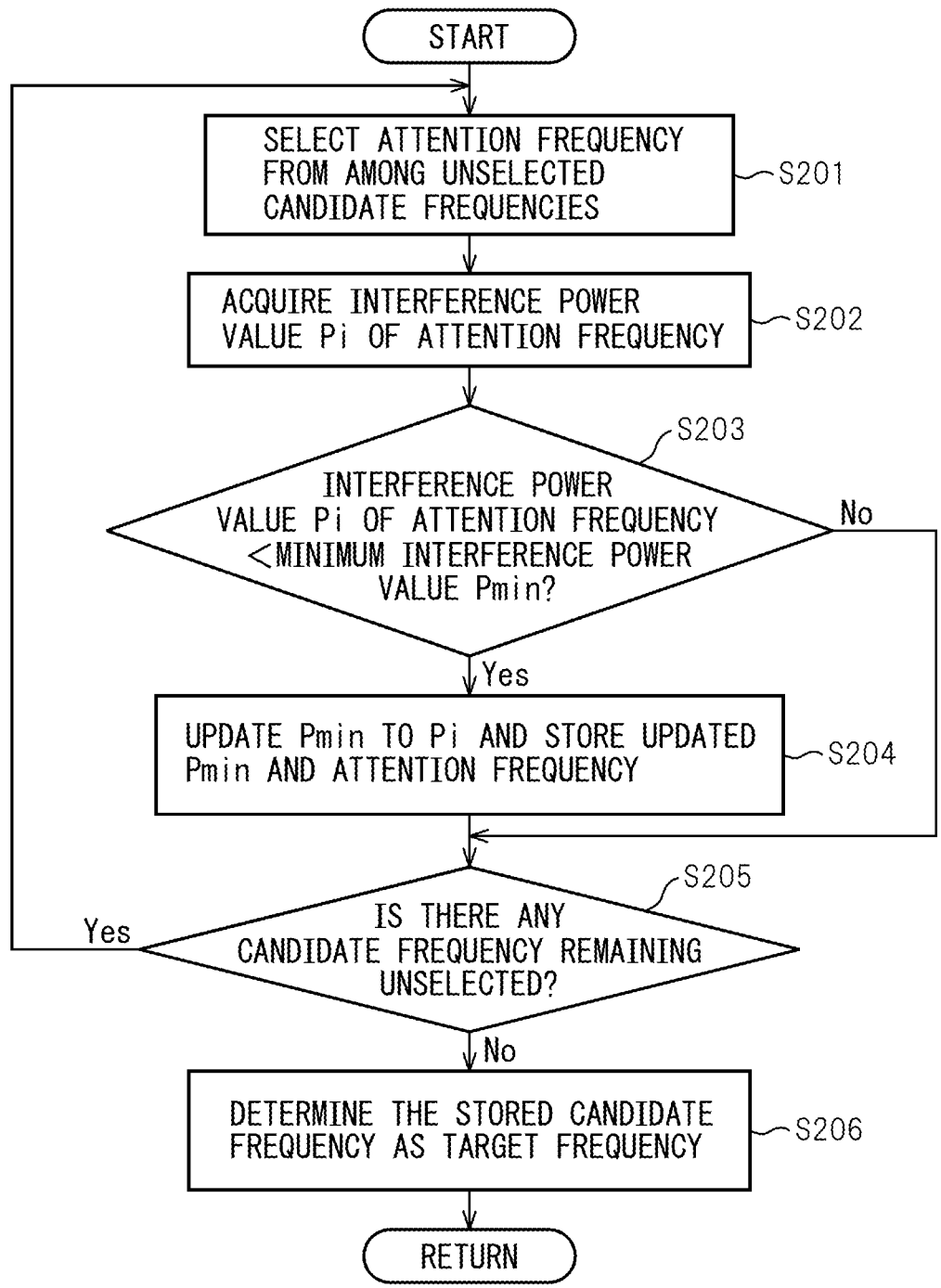
FIG. 14 is an operation flowchart illustrating a frequency reselection process.

FIG. 14 is an operation flowchart illustrating the frequency reselection process performed by the frequency selection unit 352. This frequency reselection process is performed after each mobile station radio-linked to the femto base station 3 has been handed over to the macro base station 2 in accordance with the frequency reselect instruction message that the femto base station 3 received from the macro base station 2.

As a preparatory step, the frequency selection unit 352 sets a minimum interference power value Pmin to the maximum value of the interference power value that can be measured, and stores the minimum interference power value Pmin in the storing unit 34.

The frequency selection unit 352 selects an attention frequency from among unselected candidate frequencies (step S201). The frequency selection unit 352 acquires the interference power value Pi of the attention frequency from the interference power measuring unit 351 (step S202).

The frequency selection unit 352 determines whether the interference power value Pi of the attention frequency is smaller than the currently stored minimum interference power value Pmin (step S203).

If the interference power value Pi of the attention frequency is smaller than the currently stored minimum interference power value Pmin (Yes in step S203), the frequency selection unit 352 updates the minimum interference power value Pmin to the interference power value Pi of the attention frequency. Then, the frequency selection unit 352 stores the updated minimum interference power value Pmin and the attention frequency in the storing unit 34 (step S204).

After step S204, or if the interference power value Pi of the attention frequency is not smaller than the currently stored minimum interference power value Pmin (No in step S203), the frequency selection unit 352 proceeds to determine whether there is any candidate frequency remaining unselected (step S205). If there is any candidate frequency remaining unselected (Yes in step S205), the frequency selection unit 352 repeats the process of steps S201 to S205.

On the other hand, if there is no candidate frequency remaining unselected (No in step S205), the frequency selection unit 352 determines the stored candidate frequency as the target frequency (step S206).

The frequency selection unit 352 reports the determined target frequency to the radio processing unit 31 as the frequency to be used for communication with the mobile station. After that, the radio processing unit 31 modulates the downlink signal and demodulates the uplink signal by using the reported frequency.

The frequency selection unit 352 generates a frequency reselection completion notification message by including therein information concerning the cell corresponding to the target frequency and information for identifying the mobile station that was radio-linked to the femto base station 3 before the execution of the frequency reselection process. The frequency selection unit 352 passes the frequency reselection completion notification message to the network signal processing unit 356. The network signal processing unit 356 converts the frequency reselection completion notification message into the format conforming to the X2 interface, and passes it to the wired interface unit 33 for transmission to the macro base station 2.

When the control unit 35 receives the frequency reselect instruction message, the data management unit 353 stores in the storing unit 34 the information for identifying the mobile station currently radio-linked to the femto base station 3.

When the control unit 35 receives the frequency reselect instruction message, the communication control unit 354 extracts the identification information of at least one handover candidate cell from the frequency reselect instruction message. Then, by referring to the identification information of such handover candidate cells, the communication control unit 354 causes the mobile station currently radio-linked to the femto base station 3 to hand over to an appropriate one of the handover candidate cells.

More specifically, the communication control unit 354 retrieves from the storing unit 34 the macro cell information that contains the radio frequency corresponding to the identification information of each handover candidate cell. Then, the communication control unit 354 generates a Measurement Control message, which carries information indicating the radio frequency used in each handover candidate cell, for transmission to the mobile station currently radio-linked to the femto base station 3.

The communication control unit 354 passes the Measurement Control message to the radio signal processing unit 355, and causes the radio signal processing unit 355 to generate a downlink signal by including therein the Measurement Control message. The downlink signal generated by the radio signal processing unit 355 is passed to the modulator 311 for transmission to the mobile station.

When the Measurement Report carrying the signal indicating the quality of the radiowave received from each handover candidate cell is returned from the mobile station, the communication control unit 354 selects the handover candidate cell that provided the best radiowave reception quality. Then, the communication control unit 354 generates a HANDOVER Request message by including therein the identification information of the selected handover candidate cell, and passes the HANDOVER Request message to the network signal processing unit 356. The network signal processing unit 356 converts the HANDOVER Request message into the format conforming to the X2 interface, and passes it to the wired interface unit 33 for transmission to the macro base station 2.

Figure 15:
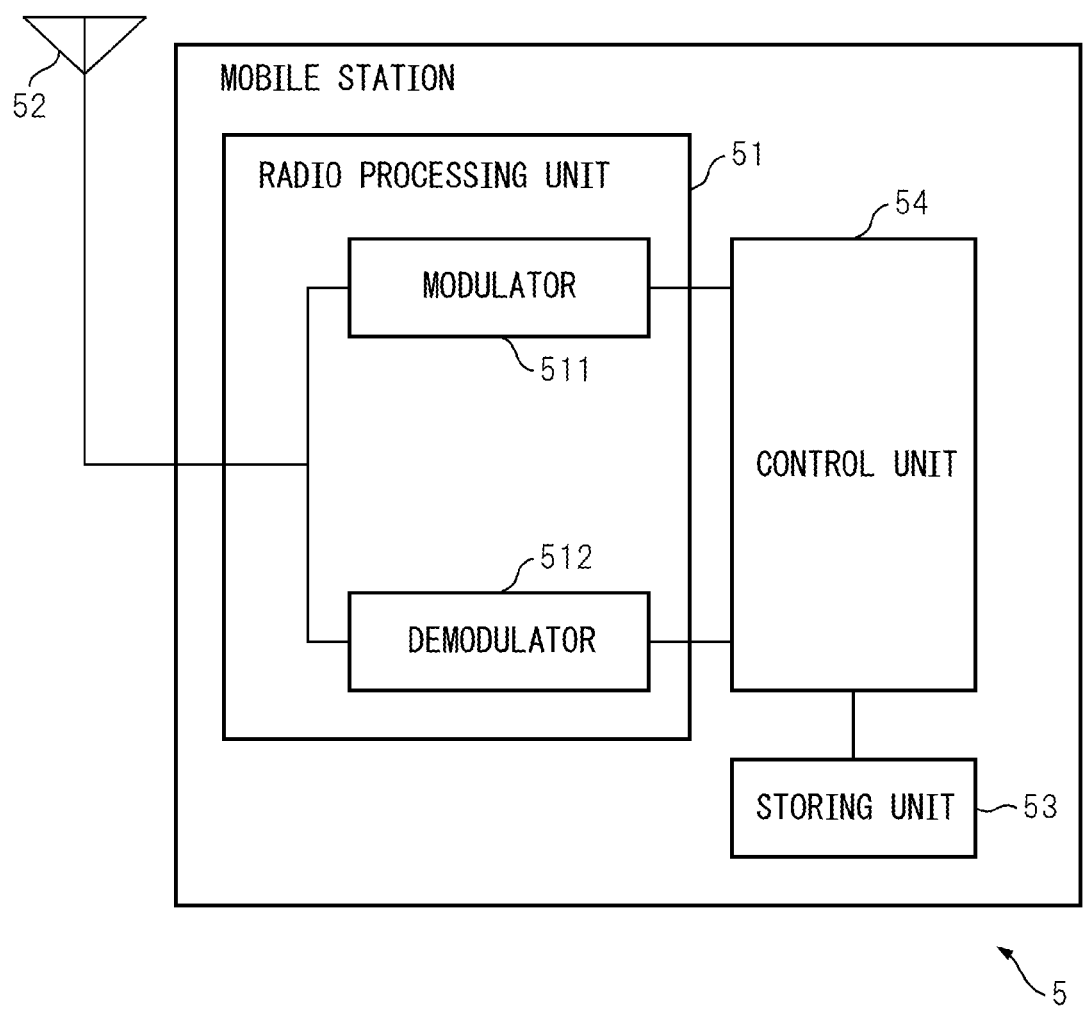
FIG. 15 is a diagram schematically illustrating the configuration of a mobile station.

FIG. 15 is a diagram schematically illustrating the configuration of the mobile station 5. The mobile station 6 is identical in configuration to the mobile station 5. The mobile station 5 includes a radio processing unit 51, an antenna 52, a storing unit 53, and a control unit 54. The radio processing unit 51 includes a modulator 511 and a demodulator 512. The radio processing unit 51, the storing unit 53, and the control unit 54 are implemented as separate circuits. Alternatively, these units may be incorporated in the mobile station 5 as a single integrated circuit on which the circuits corresponding to the respective units are integrated.

The radio processing unit 51 and antenna 52 depicted are identical in function and configuration to the radio processing unit 21 and antenna 22 of the macro base station 2 depicted in FIG. 10, except for the multiplexing scheme employed. Therefore, a detailed description of the radio processing unit 51 and antenna 52 will not be given herein.

The modulator 511 in the radio processing unit 51 multiplexes the uplink signal by using, for example, an SC-FDMA scheme. On the other hand, the demodulator 512 demultiplexes the multiplexed downlink signal by using, for example, an OFDMA scheme.

The storing unit 53 includes, for example, an alterable nonvolatile semiconductor memory. The storing unit 53 stores various kinds of information used to perform control to communicate with the base station.

The control unit 54 performs processing, such as location registration, call control, and handover, for establishing a radio connection between the mobile station 5 and any one of the base stations. For this purpose, the control unit 54 generates a control signal used when establishing a radio connection between the mobile station 5 and the base station. Further, the control unit 54 performs processing in accordance with a control signal received from the base station.

The control unit 54 creates uplink data which contains a voice signal or data signal acquired via a microphone (not depicted) or via a user interface such as a keypad (not depicted). Then, the control unit 54 applies information source coding to the uplink data. Further, the control unit 54 creates an uplink signal which carries the uplink data and control signals, and applies transmission processing, such as error-correction coding, to the uplink signal. Then, the control unit 54 passes the processed uplink signal to the modulator 511. Further, the control unit 54 receives the downlink signal transmitted via radio from the serving base station and demodulated by the demodulator 512, and applies reception processing, such as error-correction decoding and information source decoding, to the received signal. Then, the control unit 54 recovers the voice signal or data signal from the decoded downlink signal. The control unit 54 reproduces the recovered voice signal through a speaker (not depicted) or displays the data signal on a display (not depicted).

As has been described above, according to the mobile communication system disclosed herein, when a degradation of communication conditions is detected, all the mobile stations currently radio-linked to the femto base station are temporarily handed over to the macro base station. After that, the femto base station performs frequency reselection to reselect the radio frequency that minimizes the radiowave interference. The mobile communication system can reduce the radiowave interference occurring between the macro base station, the femto base station, and the mobile station, without disconnecting the communication that the mobile station is performing via the femto base station. The femto base station stores the identification information of each mobile station handed over to the macro base station and, based on the stored identification information, performs processing to reconnect the mobile station to the femto base station after the radio frequency has been changed. As a result, since the mobile communication system can reduce the number of mobile stations radio-linked to any particular macro base station after the radiowave interference has been reduced, the amount of radio resources to be allocated to each mobile station increases, thus serving to improve the communication efficiency.

The present invention is not limited to the above specific embodiment. For example, the femto base station may determine whether the radio communication condition degradation criterion is satisfied or not. In this case, if it is determined that the radio communication condition degradation criterion is satisfied, the femto base station notifies the macro base station accordingly. When notified of the radio communication condition degradation criterion being satisfied, the macro base station generates a frequency reselect instruction message, and sends the message to the femto base station that notified that the radio communication condition degradation criterion was satisfied.

The base stations need only be located proximate to each other so that radiowave interference may occur at the mobile station. For example, in the above embodiment, the macro base station or the femto base station may be replaced by a so-called micro base stations having a communication coverage area of several tens to hundreds of meters in radius.

Further, the base stations, the upper node, and the mobile stations may each be an apparatus that conforms to a communication standard other than LTE. For example, the base stations, the upper node, and the mobile stations may each be an apparatus that conforms to the International Telecommunications Union's IMT-2000 or the so-called fourth generation mobile communication system.

For example, when the base stations, the upper node, and the mobile stations are apparatuses that conform to IMT-2000, direct communication is not possible between the base stations. Therefore, in this case, the macro base station transmits the frequency reselect instruction message to the femto base station via an upper node such as a radio network controller. Likewise, the femto base station transmits the frequency reselection completion message to the macro base station via an upper node such as a radio network controller.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication system comprising:
   a first radio apparatus which defines a first cell; and
   a second radio apparatus which defines a second cell that covers an area at least a portion of which overlaps an area that the first cell covers, wherein
   when it is determined by the first or second radio apparatus that communication conditions of a first mobile station currently radio-linked to the first or second radio apparatus have degraded, then the first radio apparatus
   stores identification information of a second mobile station that belongs to the first cell and that is currently radio-linked to the first radio apparatus, and causes the second mobile station to hand over to the second cell,
   changes a first radio frequency currently used in the first cell to a second radio frequency that is different from the first radio frequency, and
   sends the second radio apparatus a message that carries identification information of the second mobile station and information indicating the second radio frequency, and wherein
   when the message is received, the second radio apparatus notifies the second mobile station identified by the identification information carried in the message of the second radio frequency, and causes the second mobile station to hand over to the first cell, and wherein
   the first or second radio apparatus determines that the communication conditions have degraded, when a radio-wave quality value indicated by a signal which is received from the first mobile station and indicates the quality of a radiowave received at the first mobile station is lower than a certain radiowave quality value.

2. The mobile communication system according to claim 1, wherein the first radio apparatus obtains an interference signal for each of a plurality of radio frequencies that the first radio apparatus can use, and determines the second radio frequency by choosing from among the plurality of radio frequencies a radio frequency that minimizes the interference signal.

3. The mobile communication system according to claim 1, wherein when it is determined that the communication conditions of the first mobile station have degraded, the second radio apparatus selects a third radio frequency as a radio frequency to be used in the second cell, the third radio frequency being different from the first radio frequency, and sends the first radio apparatus a signal indicating the third radio frequency, and the first radio apparatus notifies the second mobile station of the third radio frequency, and causes the second mobile station to hand over to the second cell.

4. A radio apparatus which defines a first cell, comprising:
   a communication condition judging unit which judges whether communication conditions of a first mobile station currently radio-linked to the radio apparatus have degraded or not;
   a frequency reselection instructing unit which, when the communication conditions of the first mobile station have degraded, generates a first message for instructing another radio apparatus to change a first radio frequency used in a second cell that is defined by the other radio apparatus and that covers an area at least a portion of which overlaps an area that the first cell covers, and to cause a second mobile station currently radio-linked to the other radio apparatus to hand over to the first cell;
   a network signal processing unit which transmits the first message to the other radio apparatus; and
   a communication control unit which after the second mobile station has been handed over to the first cell, when a second message that carries information indicating a second radio frequency used in the second cell and identification information of the second mobile station is received from the other radio apparatus, then notifies the second mobile station identified by the identification information carried in the second message of the second radio frequency and causes the second mobile station to hand over back to the second cell, and wherein
   the communication condition judging unit determines that the communication conditions have degraded, when a radiowave quality value indicated by a signal which is received from the first mobile station and indicates the quality of a radiowave received at the first mobile station is lower than a certain radiowave quality value.

5. A radio frequency change method for use in a mobile communication system that comprises a first radio apparatus which defines a first cell and a second radio apparatus which defines a second cell that covers an area at least a portion of which overlaps an area that the first cell covers, wherein:
   the first or second radio apparatus determines whether communication conditions of a first mobile station currently radio-linked to the first or second radio apparatus have degraded or not, and
   when it is determined by the first or second radio apparatus that the communication conditions of the first mobile station have degraded, then the first radio apparatus
   stores identification information of a second mobile station that belongs to the first cell and that is currently radio-linked to the first radio apparatus, and causes the second mobile station to hand over to the second cell, changes a first radio frequency currently used in the first cell to a second radio frequency that is different from the first radio frequency, and sends the second radio apparatus a message that carries identification information of the second mobile station and information indicating the second radio frequency, and wherein when the message is received, the second radio apparatus notifies the second mobile station identified by the identification information carried in the message of the second radio frequency, and causes the second mobile station to hand over to the first cell, and wherein the first or second radio apparatus determines that the communication conditions have degraded, when a radiowave quality value indicated by a signal which is received from the first mobile station and indicates the quality of a radiowave received at the first mobile station is lower than a certain radiowave quality value.

* * * * *